(No Model.)
D. WIGET & J. B. SCHNEIDER.
SHEARS.
No. 566,830. Patented Sept. 1, 1896.
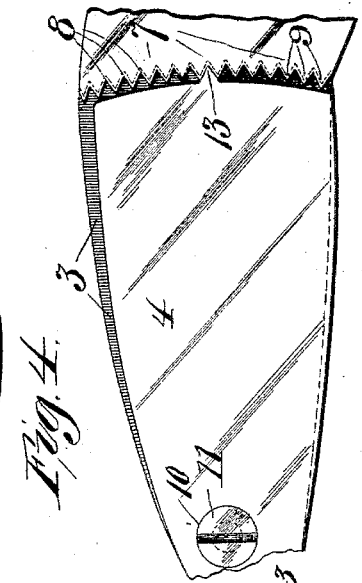
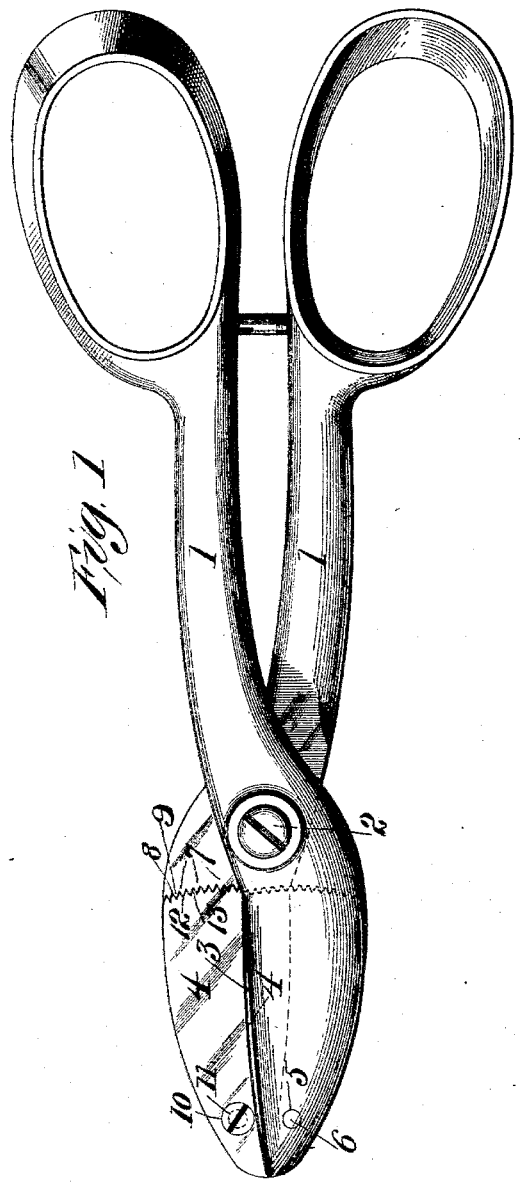
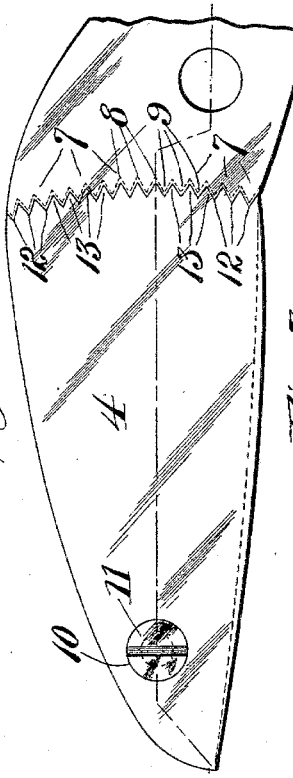
Attest:
Wm H Scott
Story Sidebotham
Inventors
John B. Schneider
Dominick Wiget
By Benj S Nyo Atty.

UNITED STATES PATENT OFFICE.

DOMINICK WIGET AND JOHN B. SCHNEIDER, OF ST. LOUIS, MISSOURI.

SHEARS.

SPECIFICATION forming part of Letters Patent No. 566,830, dated September 1, 1896.

Application filed March 21, 1896. Serial No. 584,232. (No model.)

*To all whom it may concern:*

Be it known that we, DOMINICK WIGET and JOHN B. SCHNEIDER, citizens of the United States, residing at St. Louis, in the State of Missouri, have invented a new and useful Improvement in Shears, of which the following is a specification.

Our invention relates to shears whose blades are provided with removable and adjustable face-plates; and the object of our invention is to provide improved means for adjusting the face-plates and holding them in position. We attain this object by mechanism whose preferred form is illustrated in the accompanying drawings, in which—

Figure 1 is a side elevation of a pair of shears embodying our improvement. Fig. 2 is an enlarged detailed view of one of the blades with its face-plate in the position it occupies when new. Fig. 3 is a longitudinal section on line 3 3, Fig. 2; and Fig. 4 is an enlarged detailed view of a modification, showing a face-plate partly worn out and adjusted so as to bring its edge in the proper position and showing the face-plate provided with but one tooth.

Similar figures refer to similar parts throughout the several views.

The blades 1 1 may be of any suitable form and may be connected together by a bolt 2 in the usual manner. Each blade is provided with a seat 3 for a face-plate 4. This seat preferably contains a screw-hole 5 for the reception of a screw 6, by means of which the tip of the face-plate 4 is preferably attached to its seat. The seat 3 preferably extends from the tip of the blade back to a curved notched shoulder 7, concentric with the screw-hole 5. The notches 8 in the shoulder 7 are preferably V-shaped and radially arranged with reference to the axis of the screw 6 and preferably form between them pointed teeth 9, projecting toward the axis of said screw 6. The described shapes of the notches and teeth are not essential, as will be obvious. The points of the teeth 9 and the inner edges of the notches 8 are preferably both beveled so as to slope outward from the bottom to the top, substantially as shown, but, as will be obvious, it is not essential that both should be beveled. Either the notches 8 or 12 should be beveled, and where only one set is beveled the teeth which enter the beveled notches should be beveled. The bevel of the teeth is clearly indicated by a dotted line in Fig. 3. Each of the face-plates 4 preferably contains a countersink 10, which registers with the screw-hole 5 of its seat when it is in place and which receives the head 11 of the screw 6. Its rear edge is curved on a line substantially concentric with the countersink 10 and contains notches 12, preferably corresponding in shape to the teeth 9 of the shoulder 7 and adapted to receive them. Between said notches 12 teeth 13, adapted to enter the notches 8 in the shoulder, preferably project.

The notches 12 and teeth 13 are substantially radially arranged with reference to the axis of the screw 6, and preferably both the inner ends of the notches and the points of the teeth are beveled so as to slope outward from top to bottom and respectively preferably fit substantially, the teeth and notches of the shoulder 7. As will be obvious, however, if one set of teeth is engaged the face-plate will be held in position so that, though desirable, it is not essential to bevel both the notches 12 and teeth 13. It will also be obvious to the reader that, though it is desirable that the shoulder 7 should extend across the blade, it is not essential that it should do so, and also that, though it is desirable that the rear end of the plate 4 should be notched from one side to the other, as shown, it is not essential, for if the face-plate contains but one tooth, and the shoulder 7 contains a number of notches adapted to receive and engage that tooth, adjustment is possible, and so in like manner, if the shoulder 7 contains but one tooth and the rear edge of the face-plate contains a number of notches adapted to receive that tooth, adjustments equaling the notches in number is possible, and we consider one arrrangement the strict equivalent of the other. Such an arrangement is illustrated in Fig. 4, in which all the teeth 13 except one are omitted. When a face-plate 4 becomes worn, the screw 6 connecting it to its seat is removed. The plate is then slid forward and its teeth disengaged from the shoulder 7. When ground, its old position is altered so as to bring its cutting edge in the proper place by inserting its teeth in different notches from those which they respectively occupied originally. The change does not prevent the countersink 11 from registering with the screw-hole 5, and as soon as the screw 6 is again inserted the blade is ready for use.

We claim—

1. In a shear-blade, a seat for a face-plate, a shoulder at the rear end of the seat, a fastening detachably connecting the face-plate to its seat at a single point near its tip; one or more radially-arranged teeth projecting at the rear end of the face-plate, and one or more radially-arranged sockets in said shoulder receiving said teeth in different positions of the face-plate, and said sockets and teeth being beveled and engaging and holding the rear end of the face-plate in position when its tip is connected to its seat by said fastenings substantially as described.

2. In a shear-blade a seat for a face-plate, a shoulder at the rear end of said seat containing a series of notches and teeth; a face-plate resting on said seat having its rear end provided with a series of notches and teeth; a fastening detachably connecting said plate near its tip to said seat; and said teeth and notches of the plate and shoulder being beveled and engaging each other and holding the rear end of the face-plate in position, and said seat and notches being radially arranged and said shoulder and the rear edge of said face-plate being concentric with the axis of the fastening by which the tip of the plate is held, substantially as described.

DOMINICK WIGET.
JOHN B. SCHNEIDER.

Witnesses:
BERNHARRDINE MANGELS,
BENJ. F. REX.